Jan. 19, 1954 J. H. HEIDORN 2,666,892
APPARATUS FOR MAGNETICALLY LOCATING
A ROTOR WITH RESPECT TO THE STATOR
Filed Sept. 2, 1950 5 Sheets-Sheet 1

INVENTOR.
John H Heidorn
BY
Willits Hardman and Fehr
Attorneys

Jan. 19, 1954

J. H. HEIDORN 2,666,892

APPARATUS FOR MAGNETICALLY LOCATING
A ROTOR WITH RESPECT TO THE STATOR

Filed Sept. 2, 1950

INVENTOR.
John H. Heidorn
BY
Willits, Hardman and Fehr
Attorneys

Jan. 19, 1954

J. H. HEIDORN 2,666,892

APPARATUS FOR MAGNETICALLY LOCATING
A ROTOR WITH RESPECT TO THE STATOR

Filed Sept. 2, 1950

INVENTOR.
John H. Heidorn
BY
Willits, Hardman and Fehr
attorneys

Jan. 19, 1954

J. H. HEIDORN 2,666,892

APPARATUS FOR MAGNETICALLY LOCATING
A ROTOR WITH RESPECT TO THE STATOR

Filed Sept. 2, 1950

INVENTOR.
John H. Heidorn
BY
Willits Hardman and Fehr
Attorneys

Patented Jan. 19, 1954

2,666,892

UNITED STATES PATENT OFFICE 2,666,892

APPARATUS FOR MAGNETICALLY LOCATING A ROTOR WITH RESPECT TO THE STATOR

John H. Heidorn, Dayton, Ohio, assignor to General Motors Corporation, Dayton, Ohio, a corporation of Delaware Application September 2, 1950, Serial No. 182,925

14 Claims. (Cl. 324—34)

1

This invention relates to electric apparatus and more particularly to devices for magnetically measuring and for making magnetically uniform the air gap in electric motors.

It has been customary to provide a nominal minimum dimensional air gap between the rotor and stator of electric motors. This minimum air gap has been measured by thickness gauges which are not altogether satisfactory for this purpose. Even though such gauges indicate a minimum dimensional air gap, such air gap may be so lacking in magnetic uniformity as to cause the motor to have such a hum to be classified as noisy.

It is an object of my invention to provide means for measuring the magnetic relationships across the air gap of electric motors.

It is another object of my invention to provide means for making uniform the magnetic relationships across the air gap of electric motors.

It is another object of my invention to provide means for indicating the points of maximum and minimum magnetic relationship across the air gap of electric motors.

It is another object of my invention to provide means for shifting the rotor bearings of electric motors relative to the stator in accordance with the magnetic relationships across the air gap until the magnetic relationships are substantially uniform.

Further objects and advantages of the present invention will be apparent from the following description, reference being had to the accompanying drawings, wherein a preferred form of the present invention is clearly shown.

Figure 1:
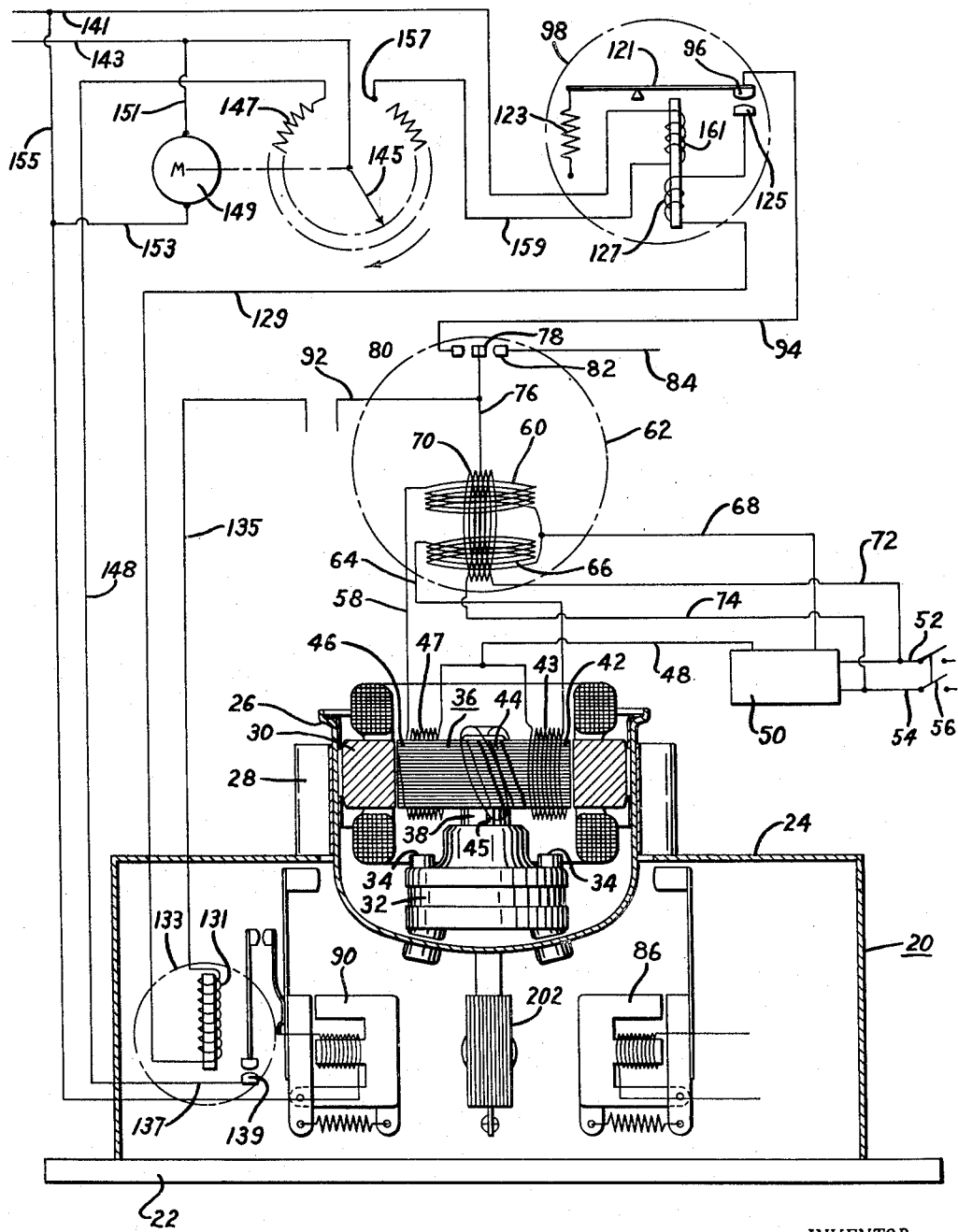
Fig. 1 is a view partly diagrammatic including a wiring diagram illustrating one form of my invention.

In Fig. 1, for the purpose of illustrating my invention, I have shown a fixture 20 which includes a base 22 and a housing 24. Supported upon the housing 24, for the purpose of illustrating one application of my invention, is a casing 26 for an electric motor. This casing 26 may include heat dissipating fins 28 which, in this particular application, rest upon the housing 24 for the purpose of supporting the motor casing thereon. The motor casing 26 has fixed within

2 it the stator 30 of an electric motor. Also within the casing 30 is a bearing support member 32 which is normally held in fixed relationship to the casing 26 by the screws 34 which pass through holes of ample size in the bearing member 32 and thread into threaded recesses in the bosses in the lower portion of the casing. The bearing member 32 may contain some form of pump but this is merely incidental to the application of the electric motor and is in no way connected with my invention. However, according to my invention, the screws 34 may be loosened to permit lateral adjustment of the location of the bearing member so as to provide a means for adjusting the position of the rotor of the electric motor relative to the stator 30.

It has been customary in the manufacture of this type and other types of electric motors to make the air gap distance between the outer periphery of the rotor and the inner periphery of the stator a dimensionally minimum amount throughout the circumference of the air gap. For small motors, .005 to .015 inch has been frequently the nominal air gap measurement. This measurement has been made by inserting narrow thickness gauges into the air gap at various points between the rotor and the stator. Through production experience, it has been found that these feeler gauges do not always make dimensionally accurate measurement of the air gap. Furthermore even though the minimum air gap as measured by such thickness gauges be maintained, it has been found that the motor will have a hum because the magnetic relationships between the rotor and the stator are not uniform throughout 360° of rotation.

According to my invention, I provide in Fig. 1 a device which will locate the bearing member 32 in such a way that the rotor, which will be mounted in the bearing member, will have a substantially uniform magnetic relationship with the stator 30 throughout 360° of rotation. To accomplish this, I provide a rotatable test member 36 having the shaft 38 which fits into the bearing member 32 in the same manner as the actual shaft of the rotor which will be used with the stator 30. The portion of the rotatable test member 36 with the exception of the shaft 38 is made up of a plurality of laminations of electrical sheet steel which may be similar to the laminations of the rotor to be used with the stator 30 in actual use. Preferably these laminations are each cut so as to form four U-shaped poles 40, 42, 44 and 46. Although not necessary, these laminations and their poles are skewed at an angle approximately the same as the rotor to be used, for example 20°. The pole 40 is provided with a winding 41; the pole 42, with a winding 43; the pole 44, with a winding 45; and the pole 46, with a winding 47. For simplicity, the windings are placed only upon one side of the U- shaped pole configuration; but this is not necessary and the windings could be placed upon both poles of the U-shaped pole if desired. Preferably the laminations, the poles, and the windings are identical. This is not absolutely necessary but it is the most convenient way of obtaining substantially uniform electromagnetic properties.

The opposite windings 41 and 45 are connected and likewise the opposite windings 43 and 47 are connected. To keep Fig. 1 simple, the remainder of the wiring system for the windings 41 and 45 has been omitted. The wiring system also has been omitted from Fig. 2 but is reproduced in Fig. 3. However, in Fig. 1, the inner terminals of the opposite windings 43 and 47 are connected by the common conductor 48 to the low side of a transformer 50 which is supplied with electric energy through the supply conductors 52 and 54 under the control of a switch 56. The outer terminal of the winding 47 is connected by the conductor 58 to one stationary or current coil 60 of an electrodynamometer type of instrument 62 which resembles in some respects, a watt meter. The outer terminal of the winding 43 is connected by a conductor 64 to the second stationary or current coil 66 of the device 62. The stationary coil 60 and 66 have their second terminals joined to the conductor 68 which connects to the second terminal of the transformer 50. The device 62 is also provided with a movable coil 70 also connected to a potential coil which is connected by the conductors 72 and 74 to the supply conductors 52 and 54.

Figure 2:
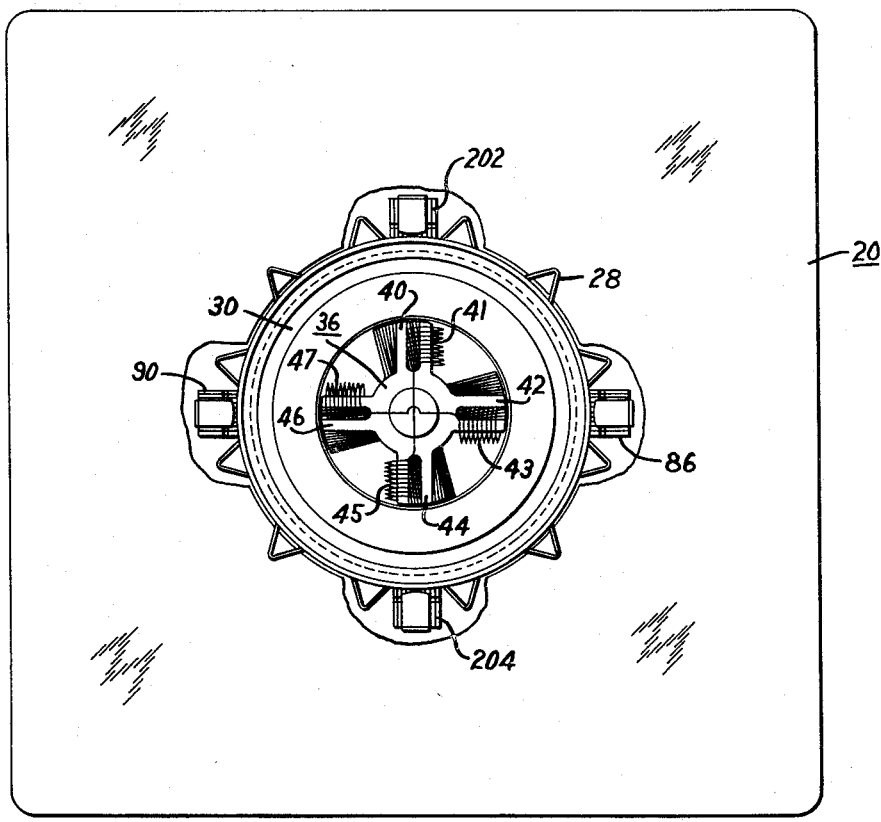
Fig. 2 is the top view of the device shown in Fig. 1.
Figure 3:
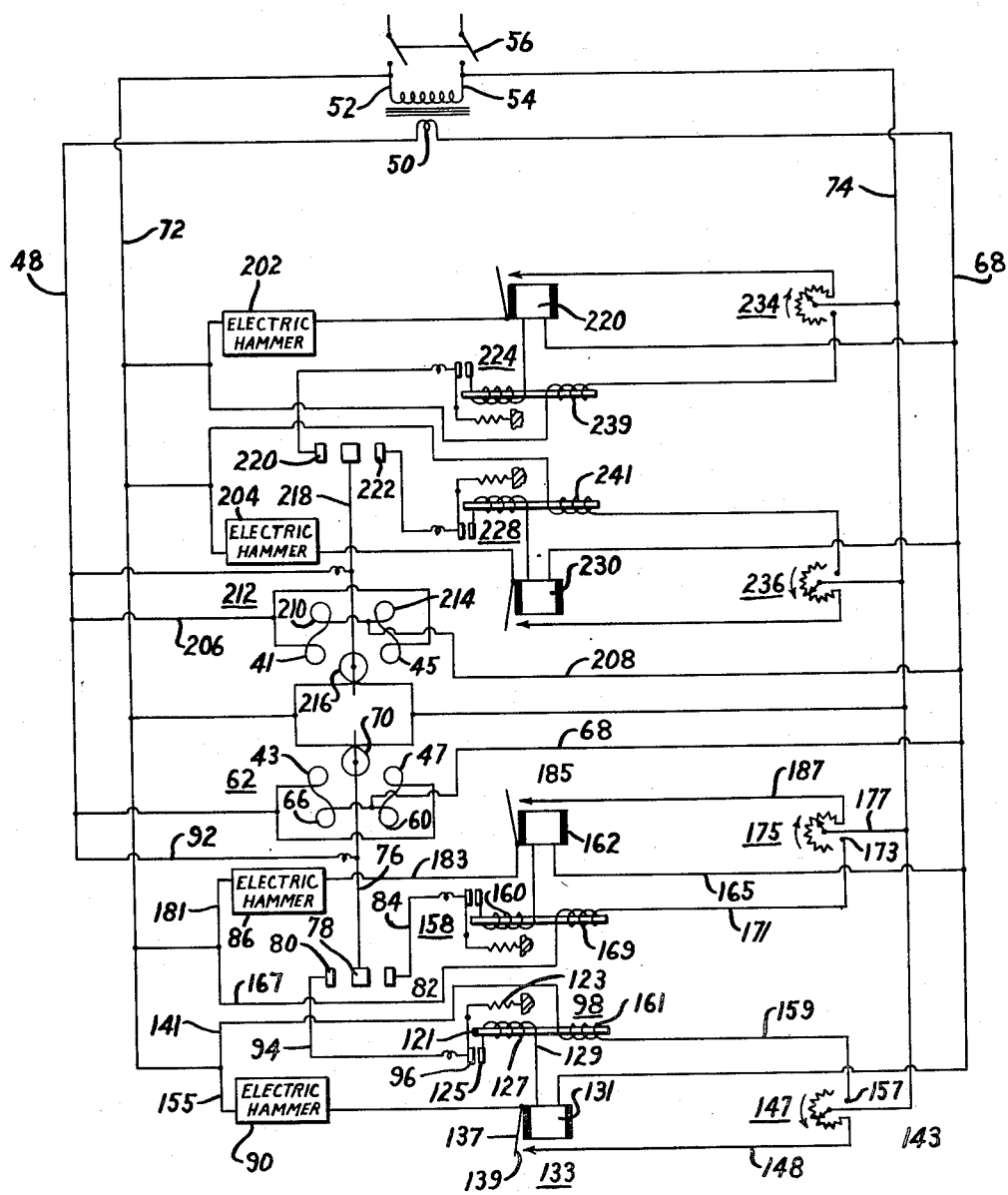
Fig. 3 is a wiring diagram of the device shown in Fig. 1.
Figure 4:
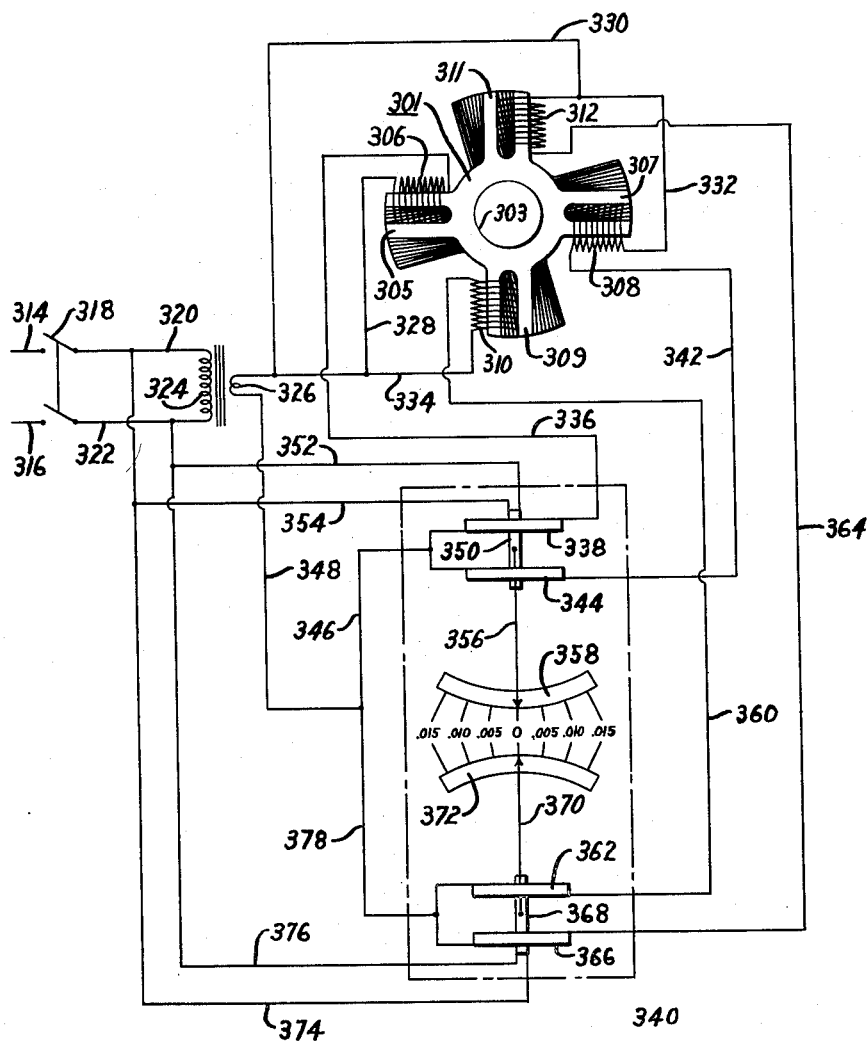
Fig. 4 is a view partly diagrammatic including a wiring diagram of another form of the invention.
Figure 6:
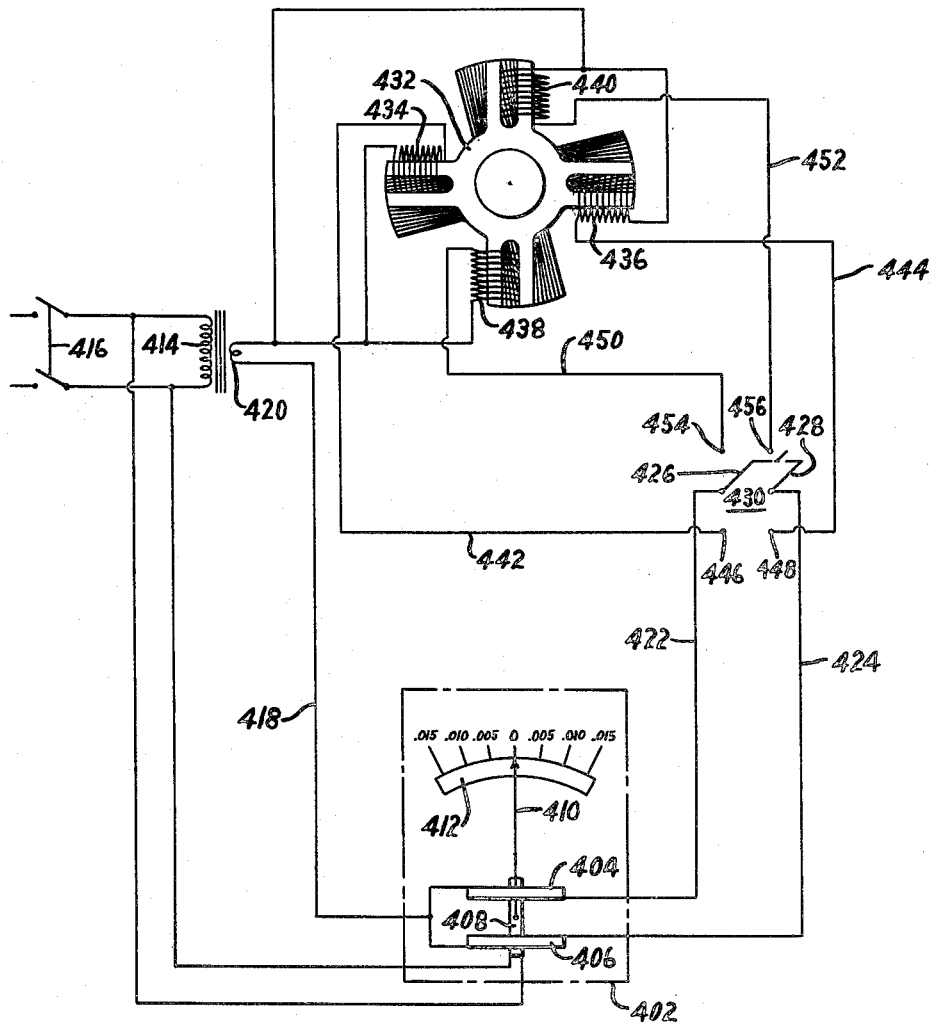
Fig. 6 is a view of another form of the invention partly diagrammatic including a wiring diagram.

The windings 43 and 47 are connected to the stationary coils 66 and 60 which are arranged in such a way that they have an equal opposite turning effect upon the coil 70 when the current flow through the windings 43 and 47 is equal as the result of the magnetic relationships of the poles 42 and 46 with the stator 30 being equal. These magnetic relationships affect the inductance of the windings 43 and 47 to affect the current flow. It should be understood that the device 62 is merely shown diagrammatically to represent an electrodynamometer type of device and only the electrical parts thereof are disclosed, and the magnetic supports and bearings are omitted since they are well known in the art. Connected to the coil 70 is an arm 76 which moves with it. In Figs. 4 and 6, this arm is merely used as an indicating means. In Figs. 1–3, this arm 76 in addition to serving as an indicating means carries a set of electrical contacts 78 which are adapted to be moved by the coil 70 and the arm 76 between the stationary contacts 80 and 82. This makes the arm 76 act not only as an indicator but also as a controlling, double acting switch. The contact 82 is connected by the conductor 84 to a circuit which is shown in Fig. 3 which provides a connection for controlling the electric hammer 86 which is provided with a hammer for striking the casing 26. In performing this particular operation, the screws 34 are not fully tight but they are only tightened until they only hold the bearing member 32 slightly more tightly than when the screws 34 are tightened by the fingers. When the bearing member 32 is so lightly held in place, the action of the electric hammer 86 upon the casing 26 will cause the bearing member 32 to be shifted by its inertia due to the effect of the hammering of the casing 26 by the electric hammer 86.

The circuit connections between the contact 82 and the electric hammer 86 are identical to the circuit connections connecting the opposite contact 80 with the electric hammer 90 which is located symmetrically to the electric hammer 86 on the opposite side of the casing 26. The conductor 92 serves to connect one terminal of the transformer 50 with the arm 76 and the contact 78. The contact 80 is connected by a conductor 94 with the movable contact 96 of a pivoted relay 98. This pivoted relay 98 includes a pivoted lever member 121 carrying the movable contact 96 which is normally held in the open position by a spring 123. The stationary contact 125 of this relay 98 is connected to a electromagnet coil 127 which in turn is connected by the conductor 129 with the electromagnet coil 131 of relay 133. The coil 131 has its second terminal connected by the conductor 135 with the second terminal of the transformer 50. The relay 133 includes a pivoted armature 137 operating contact 139 for controlling the operation of the electric hammer 90.

For refining the operation of each of the electric hammers, I have provided a device for each hammer which upon closing of one of the contacts of the electrodynamometer device will energize the hammer in gradually increasing amounts. To do this, there is provided branch supply conductors 141 and 143 which may connect to the supply conductors 52 and 54. The conductor 143 connects to the movable contact member 145 of a special type of rotary rheostat 147 which as shown in Fig. 1 is continously driven by an electric motor 149 having one terminal connected by the conductor 151 with a conductor 143 and having a second terminal connected by the conductor 153 with a conductor 155 connecting with the conductor 141.

The rotary rheostat 147 includes a contact 157 adapted to be contacted by the rotary contact member 145 for an instant during each rotation of this contact member. This contact 157 is connected by a conductor 159 to an electromagnet coil 161 which is associated with the pivoted armature 121 of the relay 98 in the manner similar to the electromagnet coil 127. This arrangement energizes the electromagnet coil 161 for an instant during each rotation of the rotary contact member 145 immediately before it begins its contact with the resistance 147 which is connected by the conductor 148 to the contacts 139 of the relay 133 which connect to the hammer 90. This closing however does not cause the operation of the hammer 90 unless the contact 78 is in engagement with the contact 80 to complete the energizing circuit of the relay 133. This circuit arrangement makes it necessary that the electric hammer 90 will always start its operation with the lightest blows provided by the rotary rheostat 147. This is because the rotary rheostat 147 begins each rotation with its maximum resistance in series with the electric hammer 90. The reason for this result is that the closing of the circuit of the relay 133 will always be delayed until the rotary rheostat has first contacted the contact 157 after which this rotary contact begins contacting the rheostat resistance element at the point of greatest resistance.

The contact 82 is connected by the conductor 84 to the contacts of the relay 158 which is identical to the relay 98. Connected to the contacts of the relay 158 is the electromagnet coil 169 of the relay 158 which is connected to the electromagnet coil of the relay 162 which in turn is connected by the conductor 165 to the low voltage supply conductor 68. A branch conductor 167 connects to the second electromagnet coil 169 of the relay 158 which in turn is connected by the conductor 171 to the instantaneous contact 173 of the rotary rheostat 175. The rotary contact of the rheostat 175 is connected by the conductor 177 to the high voltage supply conductor 74. A high voltage branch conductor 181 connects to the electric hammer 86 which in turn is connected by the conductor 183 to the contacts 185 of the relay 162 and connected by the conductor 187 to the resistance element of the rheostat 175.

The coils 41 and 45 of the test element, which are located at 90° to the coils 43 and 47, control the operation of the electric hammers 202 and 204. Their circuits are identical to the circuits of the windings 43 and 47 which control the electric hammers 86 and 90. The windings 41 and 45 are connected by having one of each of their terminals joined to the branch supply conductor 206 which connects with the low voltage supply conductor 48 and by having the other of their terminals joined to the branch supply conductor 208 which connects with the low voltage supply conductor 68. Connected in series with the coil 41 is a current coil 210 of an electrodynamometer instrument 212 which is identical to the instrument 62. Connected in series with the coil 45 is a current coil 214 which is arranged in opposing relation to the current coil 210 of this instrument 212. The rotatable voltage coil 216 of this instrument is connected in parallel with the voltage coil 70 of the instrument 62 and they are connected directly to the high voltage supply conductors 72 and 74.

Figure 5:
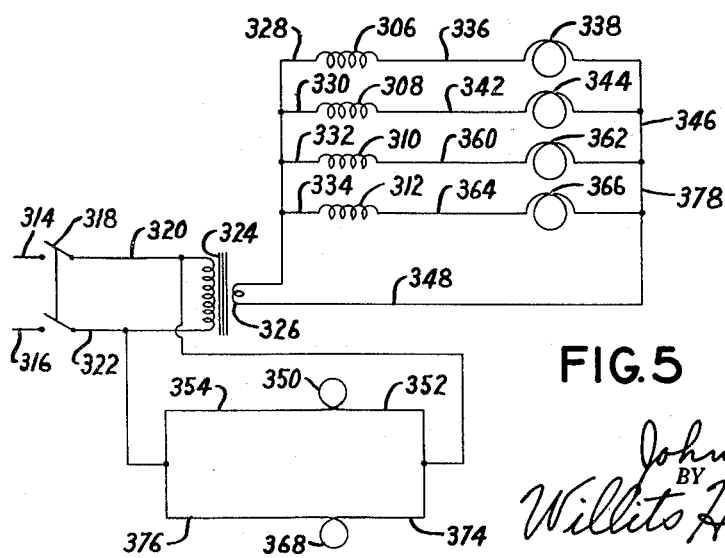
Fig. 5 is a wiring diagram of the form of the invention shown in Fig. 4.

The voltage coil 216 operates an arm 218 which is similar to the arm 76 of the instrument 62. This arm 218 acts as an indicator and also carries a contact which serves as the movable contact of a double acting switch which includes the stationary contacts 220 and 222. The contact 220 is connected to the movable contacts of a relay 224 identical to the relays 98 and 158 and these movable contacts are connected to the electromagnet coil of the relay 224 and then to the electromagnet coil of the relay 226 which in turn is connected to the low voltage supply conductor 68. The contact 222 is similarly connected to the relay 228 which is connected in turn to the electromagnet coil of the relay 230 connected to the low voltage supply conductor 68. The relays 226 and 230 are identical to the relays 162 and 133. The relay 226 controls the energization of the electric hammer 202 under the control of the rotary rheostat 234 since the contacts of the relay 226 and the hammer 202 and the rheostat 236 are connected in series across the supply conductor 72 and 74. The contacts of the relay 230 are connected in series with the electric hammer 204 and the rotary rheostat 236 across the high voltage supply conductors 72 and 74 in the same manner as the hammers 86 and 90 are connected in series with the contacts of the relays 162 and 133 and the rotary rheostat 175 and 147. The electromagnet coil 239 of the relay 224 is connected between the supply conductor 72 and the instantaneous contact of the rotary rheostat 234. The electromagnet coil 241 of the relay 228 is connected between the supply conductor 72 and the instantaneous contact of the rotary rheostat 236 in a manner similar to the electromagnet coils 161 and 169. When the screws 34 are loosened so that they are just slightly more than finger tight and the rotatable test member 36 has its shaft inserted into the bearing member 32 and the switch 56 is closed, the hammers 86, 90, 202 and 204 will operate automatically by the circuit arrangement thus described to magnetically center the test member 36 by shifting the bearing support 32 under the control of the two electrodynamometer type instruments 62 and 212. The test member 36 and its shaft may be rotated in the bearing support 32 to determine and insure the uniformity throughout 360° of rotation. When the centering has been accomplished, the screws 34 are tightened and the test member 36 is removed and the actual rotor and shaft replaces the test member 36. Since the actual rotor and shaft will be substantially identical in magnetic concentricity to the test member 36, it will also be located so that its air gap will be substantially uniform throughout 360° of rotation.

Where it is not desired to perform the centralization automatically, an indicating arrangement such as is shown in Figs. 4 and 5 may be provided so that the test member may be so located that the magnetic relationships across the air gap between the stator and the test member are substantially uniform throughout 360° of rotation. In Fig. 4, there is shown a rotatable test member 301 provided with a shaft 303 and four U-shaped poles 305, 307, 309 and 311 provided respectively with the coils 306, 308, 310 and 312. These poles and windings should be substantially identical in their electrical and magnetic characters and symmetrical with respect to the shaft 303. This rotable test member 301 may be identical to the test member 36 and is adapted to be similarly rotatably mounted in an adjustable bearing support like the bearing support 32 within a motor housing and stator as in Figs. 1 and 2.

The system is connected to the supply conductors 314 and 316 under the control of a double pole switch 318 connecting with the conductors 320 and 322 which connect to the high voltage coil of the transformer 324. The low voltage coil 326 of this transformer has one terminal connected by the branch conductors 328, 330, 332 and 334 to one terminal of each of the coils 306, 308, 310 and 312. The second terminal of the coil 306 is connected by the conductor 336 to one terminal of the upper current coil 338 of the electrodynamometer type instrument 340. Preferably this instrument 340 is like two watt meters with their scales placed one above the other. The coil 308 which is diametrically opposite the coil 306, is connected by the conductor 342 with the current coil 344 immediately below the current coil 338. The second terminals of the current coil 338 and 344 are connected by a branch conductor 346 to the low voltage supply conductor 348 which connects to the second terminal of the low voltage coil 326 of the transformer 324.

The current coils 338 and 344 cooperate with the rotatable voltage coil 350 which is connected by the branch conductors 352 and 354 with the slight conductors 320 and 322. Connected to the rotatable voltage coil 350 is a downwardly extending pointer 356 cooperating with a scale 358 which may be calibrated in various distances on either side of the zero location which indicate the amount that the test member 301 is off the position of magnetically uniform relationship across the air gap between the test member 301 and the stator within which the test member 301 is located. The test member 301 when used will be located within the stator of an electric motor in the manner illustrated in Fig. 1.

The second terminal of the coil 310 is connected by the conductor 360 to the third current coil 362 of the instrument 340. The second terminal of the coil 312 is connected by the conductor 364 with the fourth current coil 366 of the instrument 340. The current coil 338 with its test coil 306 are connected in opposition to the current coil 344 and its test coil 308. Likewise the current coil 362 with its test coil 310 are connected in opposition with opposition to the current coil 366 and its test coil 312. The current coils 338 and 344 have an opposite rotational effect upon the voltage coil 350 so that when the current through the coils is equal the pointer 356 will give a zero indication. If the magnetic relationship at the pole 307 is greater than the magnetic relationship at the pole 305, then the pointer 356 will move to the right a distance proportional to the difference in magnetic relationships.

The current coils 362 and 366 cooperate with a rotatable voltage coil 368 having connected to it a pointer 370. The pointer 370 is located opposite to the pointer 356 and cooperates with a second scale 372 which is conveniently located near the first scale 358 so that both transformer indications can be observed simultaneously. The voltage coil 368 is connected by the branch supply conductors 374 and 376 to the supply conductors 320 and 322. The second terminals of the current coils 362 and 366 are connected by the branch conductors 378 to the low voltage supply conductor 348.

By this comparatively simple instrument, it is possible to determine whether the magnetic relationships of the air gap are uniform and if the relationships are not uniform, it is possible to determine the point at which the magnetic relations are at a maximum and minimum. This can readily be determined by rotating the test member 301 in the bearings through 90° of rotation. The maximum and minimum points will be indicated when the test member 301 is turned to the position at which the pointers 356 and 370 have their maximum and minimum deflection. The pointer 356 will indicate the eccentricities across the axis of the poles 305 and 307 while the pointer 370 will indicate the eccentricities across the axis of the poles 309 and 311. The location of the bearing for the shaft 303 can then be moved until the pointers 356 and 370 substantially reach their zero positions.

In Fig. 6 is shown another simplified form of the invention. In this figure instead of using a duplex electrodynamometer instrument like the instrument 340, there is only a single instrument 402 provided having the opposed current coils 404 and 406 which cooperate with a rotatable voltage coil 408 carrying the pointer 410 cooperating with a scale 412. The voltage coil 408 is connected to the supply conductors of the transformer 414 which is under the control of a double pole switch 416. The current coils 404 and 406 are connected in opposition to each other by having their opposite terminals joined together and connected by the conductor 418 to the low voltage coil 420 of the transformer 414. The second terminals of the current coils 404 and 406 are connected by the conductors 422 and 424 to the two movable contacts 426 and 428 of a double pole, double throw switch 430.

In this form, there is provided a rotatable test member 432 preferably identical to the rotatable test members 301 and 36 and similarly having four U-shaped poles positioned at 90° to each other provided with identical coils 434, 436, 438 and 440. The test member 432 is adapted to be used with a stator like that shown in Figs. 1 and 2. The coils 434 and 436 each have one of their terminals connected by branch supply conductors to the upper terminal of the low voltage coil 420 and their second terminals connected by the conductors 442 and 444 to the lower stationary contacts 446 and 448 of the double pole, double throw switch 430. The coils 438 and 440 have one of their terminals connected to the upper terminal of the low voltage transformer coil 420 and their second terminals connected by the conductors 450 and 452 to the upper stationary contacts 454 and 456 of the double pole, double throw switch 430. The connections of the current coils 404 and 406 with the double pole, double throw switch 430 and the connections of the coils 434 and 436 and the connections of the coils 438 and 440 with the double pole, double throw switch 430 are arranged to connect them to the opposed current coils 404 and 406 so that any difference in the magnetic relationships will cause a difference in current flow which will be indicated by the pointer 410 in cooperation with scale 412. Obviously in this form, the magnetic relationships of only two opposite poles at any one time can be measured by the instrument 402. The test member 432 of course is used in connection with a stator and bearing which may be like the stator 30 and the bearing 32 in Fig. 1.

While I prefer to use a test member having four poles and windings for simultaneously testing the magnetic relationships at four different points, it is obvious that a test member having only one pole and one winding could be used and rotated to compare the magnetic relationships through 360° of rotation with a single current coil instrument.

While the form of embodiment of the invention as herein disclosed, constitutes a preferred form, it is to be understood that other forms might be adopted, as may come within the scope of the claims which follow.

What is claimed is as follows:

1. A locating device for properly locating a rotor shaft bearing relative to the stator of an electric motor including a member having a shaft bearing portion similar to the shaft bearing portion of the rotor to be used to be inserted into the rotor shaft bearing, said member also being shaped to provide a pair of opposed duplex poles symmetrically positioned relative to its shaft bearing portion and having their outer extremities terminating substantially at the theoretical periphery of a perfect rotor, said duplex poles being provided with identical windings, an electrodynamometer type device having a potential coil and two stationary coils, a power supply, and means connecting one of said windings and one of said stationary coils in series with each other to said power supply and connecting the second of said windings and the second stationary coil in series with each other across the power supply in opposed relation to said one winding and said one stationary coil to cause the potential coil to be deflected in accordance with the magnetic differences in the gaps between the two duplex poles and the adjacent portions of the stator.

2. A locating device for properly locating a rotor shaft bearing relative to the stator of an electric motor including a member having a shaft bearing portion similar to the shaft bearing portion of the rotor to be used to be inserted into the rotor shaft bearing, said member also being shaped to provide a pair of opposite duplex poles symmetrically positioned relative to its shaft bearing portion and having their outer extremities terminating substantially at the theoretical periphery of a perfect rotor, said duplex poles being provided with identical windings, an electrodynamometer type device having a potential coil and two stationary coils, a power supply, and means connecting one of said windings and one of said stationary coils in series with each other to said power supply and connecting the second of said windings and the second stationary coil in series with each other across the power supply in opposed relation to said one winding and said one stationary coil to cause the potential coil to be deflected in accordance with the magnetic differences in the gaps between the two duplex poles and the adjacent portions of the stator, and an indicating means operated by said potential coil for indicating the magnetic differences in the gaps at the poles.

3. A locating device for properly locating a rotor shaft bearing relative to the stator of an electric motor including a member having a shaft bearing portion similar to the shaft bearing portion of the rotor to be used to be inserted into the rotor shaft bearing, said member also being shaped to provide a pair of opposite duplex poles symmetrically positioned relative to its shaft bearing portion and having their outer extremities terminating substantially at the theoretical periphery of a perfect rotor, said duplex poles being provided with identical windings, an electrodynamometer type device having a potential coil and two stationary coils, a power supply, and means connecting one of said windings and one of said stationary coils in series with each other to said power supply and connecting the second of said windings and the second stationary coil in series with each other across the power supply in opposed relation to said one winding and said one stationary coil to cause the potential coil to be deflected in accordance with the magnetic differences in the gaps between the two duplex poles and the adjacent portions of the stator and an adjusting means controlled by the deflection of said potential coil for adjusting the location of the rotor shaft bearing until the magnetic differences in the gaps at the ends of the poles are minimized.

4. A locating device for properly locating a rotor shaft bearing relative to the stator of an electric motor including a member having a shaft bearing portion similar to the shaft bearing portion of the rotor to be used to be inserted into the rotor shaft bearing, said member being also shaped to provide two pairs of opposite duplex poles symmetrically positioned to its shaft bearing, said pairs of opposite duplex poles being arranged perpendicular to each other in a plane perpendicular to the axis of the shaft bearing, said poles having their outer extremities terminating substantially at the theoretical periphery of the rotor, said pairs of poles being provided with identical windings, an electrodynamometer type device having a potential coil and two opposed stationary coils, a power supply, means connecting the windings upon the opposite pairs of poles with the opposed stationary coils separately connected in series with them to said power supply to cause the potential coil to be deflected in accordance with any difference in the magnetic relationships at the poles.

5. A locating device for properly locating a rotor shaft bearing relative to the stator of an electric motor including a member having a shaft bearing portion similar to the shaft bearing portion of the rotor to be used to be inserted into the rotor shaft bearing, said member being also shaped to provide two pairs of opposite duplex poles symmetrically positioned to its shaft bearing, said pairs of opposite duplex poles being arranged perpendicular to each other in a plane perpendicular to the axis of the shaft bearing, said poles having their outer extremities terminating substantially at the theoretical periphery of the rotor, said pairs of poles being provided with identical windings, an electrodynamometer type device having a potential coil and two opposed stationary coils, a power supply, means connecting the windings upon the opposite pairs of poles with the opposed stationary coils separately connected in series with them to said power supply to cause the potential coil to be deflected in accordance with any difference in the magnetic relationships at the poles, and an indicating means operated by said potential coil for indicating the magnetic differences at the poles.

6. A locating device for properly locating a rotor shaft bearing relative to the stator of an electric motor including a member having a shaft bearing portion similar to the shaft bearing portion of the rotor to be used to be inserted into the rotor shaft bearing, said member being also shaped to provide two pairs of opposite duplex poles symmetrically positioned to its shaft bearing, said pairs of opposite duplex poles being arranged perpendicular to each other in a plane perpendicular to the axis of the shaft bearing, said poles having their outer extremities terminating substantially at the theoretical periphery of the rotor, said pairs of poles being provided with identical windings, an electrodynamometer type device having a potential coil and two opposed stationary coils, a power supply, means connecting the windings upon the opposite pairs of poles with the opposed stationary coils separately connected in series with them to said power supply to cause the potential coil to be deflected in accordance with any difference in the magnetic relationships at the poles and an adjusting means controlled by the deflection of said potential coil for adjusting the location of the rotor shaft bearing until the magnetic differences in the gaps at the ends of the poles are minimized.

7. A locating device for properly locating a rotor shaft bearing relative to the stator of an electric motor including a member having a shaft bearing portion similar to the shaft bearing portion of the rotor to be used to be inserted into the rotor shaft bearing, said member being also shaped to provide two pairs of opposite duplex poles symmetrically positioned to its shaft bearing, said pairs of opposite duplex poles being arranged perpendicular to each other in a plane perpendicular to the axis of the shaft bearing, said poles having their outer extremities terminating substantially at the theoretical periphery of the rotor, said pairs of poles being provided with identical windings, two electrodynamometer type devices each having a potential coil and two opposed stationary coils, a power supply, means connecting the windings upon one of the opposite pairs of poles with the opposed stationary coils of one of the dynamometer type devices connected in series with them to the power supply to cause the one potential coil to be deflected in accordance with any difference in magnetic relationships at the one pair of poles, and means connecting the windings upon the second opposite pairs of poles in series with the opposed stationary coils of the second dynamometer type device to the power supply to cause the second potential coil to be deflected in accordance with any difference in magnetic relationship at the second pair of poles.

8. A locating device for properly locating a rotor shaft bearing relative to the stator of an electric motor including a member having a shaft bearing portion similar to the shaft bearing portion of the rotor to be used to be inserted into the rotor shaft bearing, said member also being shaped to provide a pair of opposite duplex poles symmetrically positioned relative to its shaft bearing portion and having their outer extremities terminating substantially at the theoretical periphery of a perfect rotor, said pair of duplex poles each being provided with an electromagnetically equivalent winding, a power supply, a differential indicating device, and means connecting the differential indicating device to the windings and the power supply to show differences in current flow through the windings.

9. A locating device for properly locating a rotor shaft bearing relative to the stator of an electric motor including a member having a shaft bearing portion similar to the shaft bearing portion of the rotor to be used to be inserted into the rotor shaft bearing, said member also being shaped to provide a pair of opposite duplex poles symmetrically positioned relative to its shaft bearing portion and having their outer extremities terminating substantially at the theoretical periphery of a perfect rotor, a power supply, a differential type current responsive means having two opposed current responsive elements, said duplex poles each having an electromagnetically equivalent winding, one of said windings being connected to the power supply and to one of said opposed elements, the second of said windings being connected to the power supply and to the second of said opposed elements.

10. An apparatus for electrically detecting the location of a rotatable means within a surrounding structure which includes magnetic material, said rotatable means including two electromagnetic portions located substantially 180° part, said electromagnetic portions each including an electromagnetically equivalent pole and winding, a power supply, a differential type current responsive means having two opposed current responsive elements, one of said windings being connected to the power supply and to one of said opposed elements, the other of said windings being connected to the power supply and to the other of said opposed elements.

11. An apparatus for electrically detecting the location of a rotatable means within a surrounding structure which includes magnetic material, said rotatable means including two electromagnetic portions located substantially 180° apart, said electromagnetic portions each including an electromagnetically equivalent duplex pole and a winding, a power supply, a differential type current responsive means having two opposed current responsive elements, one of said windings being connected to the power supply and to one of said opposed elements, the other of said windings being connected to the power supply and to the other of said opposed elements.

12. A locating device for properly locating a rotor shaft bearing relative to the stator of an electric motor including a member having a shaft bearing portion similar to the shaft bearing portion of the rotor to be used to be inserted into the rotor shaft bearing, said member also being shaped to provide two electromagnetically equivalent magnetic poles located 180° apart, each of said poles having an electromagnetically equivalent winding, a power supply, a differential type of current responsive means having two opposed current responsive elements, one of said windings being connected to the power supply and one of said elements, the other of said windings being connected to the power supply and the other of said elements.

13. An apparatus for electrically detecting the location of a means within a surrounding structure which includes magnetic material, said means including at least four electromagnetic portions symmetrically located, said electromagnetic portions each including an electromagnetically equivalent pole and winding, a power supply, a differential type current responsive means having two opposed current responsive elements means connecting one of the windings of one of the diametrically opposite electromagnetic portions to one of said opposed elements and said power supply, and means connecting the other winding of said one diametrically opposite electromagnetic portions to the other of said opposed elements and said power supply.

14. An apparatus for electrically detecting the location of a means within a surrounding structure which includes magnetic material, said means including at least four electromagnetic portions symmetrically located, said electromagnetic portions each including an electromagnetically equivalent pole and winding, a power supply, a differential type current responsive means having two opposed current responsive elements means connecting one of the windings of one of the diametrically opposite electromagnetic portions to one of said opposed elements and said power supply, and means connecting the other winding of said one diametrically opposite electromagnetic portions to the other of said opposed elements and said power supply, a second differential type current responsive means having two opposed current responsive elements, means connecting one of the windings of a second set of diametrically opposite electromagnetic portions to one of the opposed elements of the second current responsive means and the power supply, and means connecting the other of said second set of diametrically opposite electromagnetic portions to the other of the opposed elements of the second current responsive means and the power supply.

JOHN H. HEIDORN.

References Cited in the file of this patent

UNITED STATES PATENTS

| Number | Name | Date |
|---|---|---|
| 1,632,076 | Hubbard | June 14, 1927 |
| 1,687,637 | Reynders | Oct. 16, 1928 |
| 2,078,796 | Greentree et al. | Apr. 27, 1937 |
| 2,303,424 | Bendz | Dec. 1, 1942 |
| 2,340,609 | Mestas | Feb. 1, 1944 |
| 2,474,883 | Zenor | July 5, 1949 |
| 2,527,170 | Williams | Oct. 24, 1950 |
| 2,531,414 | Engvall | Nov. 28, 1950 |